(12) United States Patent
Vicars

(10) Patent No.: US 7,172,175 B2
(45) Date of Patent: *Feb. 6, 2007

(54) SUCTION VALVE

(75) Inventor: Berton L. Vicars, Odessa, TX (US)

(73) Assignee: Gardner Denver, Inc., Quincy, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/764,902

(22) Filed: Jan. 26, 2004

(65) Prior Publication Data

US 2005/0000571 A1  Jan. 6, 2005

(51) Int. Cl.
*F16K 15/06* (2006.01)

(52) U.S. Cl. ............... 251/324; 251/318; 137/542; 137/516.29

(58) Field of Classification Search ........... 137/541, 137/543, 542, 543.13, 516.25, 516.29; 251/322, 251/323, 324, 318
See application file for complete search history.

(56) References Cited

U.S. PATENT DOCUMENTS

| 144,844 | A | | 11/1873 | Gould et al. |
|---|---|---|---|---|
| 185,578 | A | | 12/1876 | Rankin |
| 1,705,800 | A | * | 3/1929 | Akeyson ............ 251/332 |
| 2,078,347 | A | | 4/1937 | Shepherd et al. |
| 2,854,021 | A | | 9/1958 | Baldwin, Jr. et al. |
| 3,098,642 | A | | 7/1963 | Kucmerosky et al. |
| 3,373,695 | A | | 3/1968 | Yohpe |
| 3,427,988 | A | | 2/1969 | Redman et al. |
| 3,800,824 | A | | 4/1974 | Medina |
| 3,882,883 | A | * | 5/1975 | Droegemueller ............ 251/324 |
| 4,368,756 | A | | 1/1983 | Carlson |
| 4,432,386 | A | | 2/1984 | Pacht |
| 4,614,661 | A | | 9/1986 | White et al. |
| 4,766,927 | A | | 8/1988 | Conatser |
| 5,171,136 | A | | 12/1992 | Pacht |

(Continued)

FOREIGN PATENT DOCUMENTS

CA    1113346    12/1981

OTHER PUBLICATIONS

IDS from U.S. Appl. No. 10/114,356, parent case, Suction Valve.

(Continued)

*Primary Examiner*—Kevin Lee
(74) *Attorney, Agent, or Firm*—Barnes & Thornburg LLP; James B. Conte

(57) ABSTRACT

A suction valve including a valve seat and a piston movably joined to the valve seat. The piston has a head for engaging the top surface of the valve seat and a stem extending downwardly from the head through the valve seat. A valve guide is positioned adjacent the bottom surface of the valve seat and slidably receives the stem. A valve keeper is fitted upon the stem such that the valve guide is disposed between the valve seat and the valve keeper. A keeper pin is slidably positioned within a transverse aperture in the stem and abuts the bottom of the valve keeper. A compressed spring is positioned between, and exerts opposing forces upon, the valve guide and the valve keeper so as to normally retain the head of the piston in engagement with the top surface of the valve seat.

1 Claim, 1 Drawing Sheet

U.S. PATENT DOCUMENTS 5,253,987 A    10/1993  Harrison
5,636,975 A    6/1997   Tiffany et al.
6,695,007 B2 * 2/2004   Vicars ........................ 137/541

OTHER PUBLICATIONS

Notice of References Cited from parent case U.S. 10/114,356, Vicars, Suction Valve.
Jan. 24, 2001—Letter to Cudd Pumping Services (2pp).
Jan. 24, 2001—Memo to Bert Vicars (2 pp).
Jan. 30, 2001—Memo to Cudd (3pp).
Feb. 1, 2001—Letter to Cudd (2pp).
Feb. 15, 2001—Letter to Cudd (2 pp).
Feb. 15, 2001—Letter to Conroe Plastic Mold, Inc. (1 p).
Mar. 7, 2001—Letter to C.B. Gear & Machine, Inc. (4pp).
May 18, 2001—Letter to Conroe Plastic Mold, Inc. (1 p).
May 31, 2001—Letter to Cudd (2pp).
Jul. 16, 2001—Letter to Conroe (2pp).
Jul. 18, 2001—Letter to Cudd (Jimmy Brown, 1 page).
Jul. 18, 2001—Letter to Cudd (Bill DeShazer, 2 pp).
Feb. 12, 2002—Letter to Conroe (1 page).
Cross-Section of valve on sale one year prior to invention.

* cited by examiner

SUCTION VALVE

FIELD OF THE INVENTION

The present invention relates generally to fluid handling apparatus and, more particularly, to direct response valves of reciprocating type.

BACKGROUND OF THE INVENTION

It is not uncommon for subterranean reservoir rocks to be fully saturated with oil and gas yet be of such low permeability that they are not feasible to develop in an economic manner. In such cases, production rates are often boosted by resorting to hydraulic fracturing, a technique that increases rock permeability by opening channels through which reservoir fluids can flow to recovery wells. During hydraulic fracturing, a fluid such as water is pumped into the earth under extremely high pressure where it enters a reservoir rock and fractures it. Sand grains, aluminum pellets, glass beads, or other proppants are carried in suspension by the fluid into the fractures. When the pressure is released at the surface, the fractures partially close on the proppants, leaving channels for oil and gas to flow to recovery wells.

Specialized pumps are used to develop the pressures necessary to complete a hydraulic fracturing procedure or "frac job." These pumps are usually provided with so-called fluid ends within which reciprocating plungers place fluids under pressure. Suction and discharge valves control fluid flow to and from the plungers. Improperly locating a valve in the fluid end at the time of manufacture can greatly weaken the fluid end, leading to catastrophic pump failures. Similarly, a valve that has too many projections can capture or "knock out" enough proppant to block the flow of fluid through a pump requiring, at a minimum, that time and effort be invested to clear the blockage—a costly undertaking in an oilfield environment.

SUMMARY OF THE INVENTION

In light of the problems associated with fluid ends of pumps used for hydraulic fracturing, it is a principal object of the invention to provide a suction valve that reduces the likelihood of proppant being knocked out of suspension to create a blockage. The suction valve of the present invention, thus, offers few impediments to flow through a fluid end when open so that fracturing fluids can flow smoothly through it. As a result, fracturing fluids with higher than normal concentrations of suspended proppants can be pumped with substantial cost savings to the user. Unlike a conventional, wing-guided valve, no spring retainer projects into the plunger bore to close the open valve and, sometimes, undesirably knock out proppants.

It is another object of the invention to provide a suction valve of the type described that may be seated in a relatively shallow pocket in a fluid end. A valve pocket of shallow depth, of course, requires less load-bearing material to be removed from the body of a fluid end than does one of greater depth like that required for a wing-guided valve. It is less likely, then, that a fluid end configured to receive the suction valve of the present invention will fail from the development of excessive internal loads and stresses.

It is a further object of the invention to provide a suction valve of the type described that utilizes a valve seat that abuts its supporting surface, i.e., a seat deck, at a shallow incline rather than at right angles as has been commonly done. This slope of about 30° has been found to significantly reduce zones of stress transmitted through a fluid end. It is along such zones that fluid ends have been known to crack and fail under load.

It is an object of the invention to provide improved elements and arrangements thereof in a suction valve for the purposes described which is relatively lightweight in construction, inexpensive to manufacture, and dependable in use.

Briefly, the suction valve in accordance with this invention achieves the intended objects by featuring a valve seat and a piston movably joined to the valve seat. The piston has a head for engaging the top surface of the valve seat and a stem extending downwardly from the head through the valve seat. A streamlined valve guide is positioned adjacent the bottom surface of the valve seat and slidably receives the stem. A valve keeper is fitted upon the stem such that the valve guide is disposed between the valve seat and the valve keeper. A keeper pin is slidably positioned within a transverse aperture in the stem and abuts the bottom of the valve keeper. A compressed spring is positioned between, and exerts opposing forces upon, the valve guide and the valve keeper so as to normally retain the head of the piston in engagement with the top surface of the valve seat. Means are provided for preventing the unintentional separation of the keeper pin from the stem and keeper.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
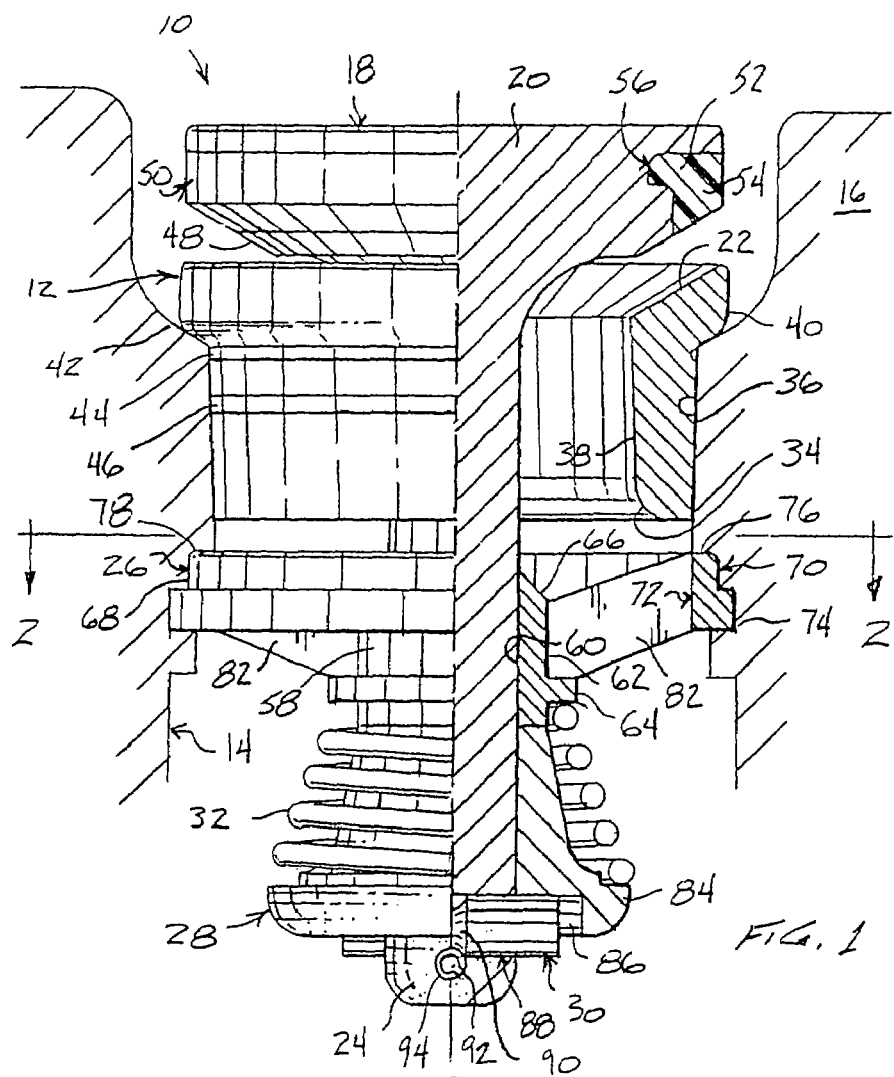
FIG. 1 is a side elevational view of a suction valve in accordance with the present invention with portions broken away to reveal details thereof.
Figure 2:
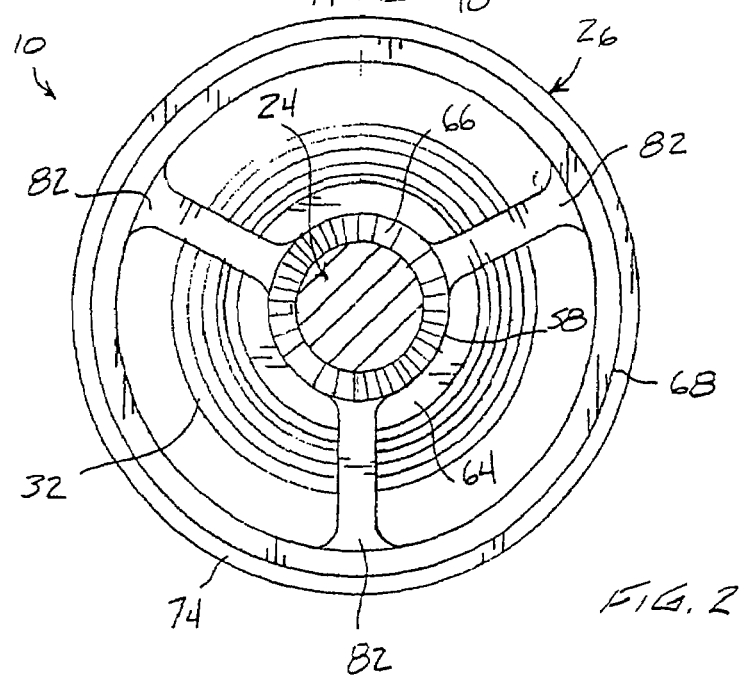
FIG. 2 is a cross-sectional view taken along line 2—2 of FIG. 1.

Referring now to the FIGS., a suction valve in accordance with the present invention is shown at 10. Valve 10 includes a valve seat 12 for positioning in a suction passage 14 of a fluid end 16 and a piston 18 for controlling the flow of fluid through passage 14. Piston 18 has a head 20 for engaging the top surface 22 of seat 12 and a stem 24 extending downwardly from head 20 through seat 12. The bottom of stem 24 extends through a valve guide 26 positioned beneath valve seat 12. A valve keeper 28 is fitted upon the bottom of stem 24 and is retained there by a keeper pin 30. A compressed spring 32 is positioned between guide 26 and keeper 28 to normally retain head 20 in engagement with seat 12 to prevent fluid flow through passage 14.

Valve seat 12 is a hollow cylinder or tube with top and bottom surfaces 22 and 34 that are shaped to reduce turbulence. As shown, top surface 22 is beveled such that it slopes downwardly and inwardly toward the center of seat 12 at an angle of about 30°. Bottom surface 34, however, slopes upwardly and inwardly at an incline that increases evenly from the outer wall 36 of seat 12 to the inner wall 38 thereof. Thus, bottom surface 34 is rounded.

Extending outwardly from the top of outer wall 36 of valve seat 12 is a peripheral flange 40. The bottom of flange 40 slopes downwardly and inwardly toward outer wall 36 at an angle of approximately 30°. This angle corresponds with that of a seat deck 42 in fluid end 16 that surrounds passage 14 thereby ensuring a strong platform for seat 12 capable of reducing the transmission of stresses to fluid end 16. To ensure against fluid leaks around seat 12, outer wall 36 is provided with a pair of peripheral grooves beneath flange 40 within which are positioned O-ring seals 44 and 46 for engaging fluid end 16.

Head 20 of piston 18 has a beveled peripheral edge 48 that is adapted to snugly engage top surface 22 of seat 12. Preferably, edge 48 carries a durable band or insert 50 formed of hard plastic that serves as sealing element for valve 10. Insert 50 has a cross-section resembling an inverted "L" with an upper, horizontal leg 52 from which a vertical leg 54 extends downwardly. A peripheral channel 56 with a corresponding, inverted "L" shape in head 20 receives and retains insert 50.

Valve guide 26 includes an inner ring 58 that slidably receives stem 24 of piston 18. Ring 58 has an interior wall 60 for engaging stem 24 and an opposed exterior wall 62. Extending outwardly from the bottom of exterior wall 62 is a radial flange 64 that serves as an abutment for the top of spring 32. A top wall 66 connects walls 60 and 62 together above flange 64 and slopes upwardly and inwardly so as to reduce turbulence in a fluid flowing through guide 26.

An outer ring 68 surrounds inner ring 58. Preferably, ring 68 has an outside wall 70 for engaging fluid end 16 and an opposed inside wall 72. A circumferential flange 74 projects from outside wall 70 and, with outside wall 70 and a topside wall 76 connecting walls 70 and 72, engages a seat deck 78 in fluid end 16 surrounding passage 14. Since guide 26 transmits significantly smaller loads to fluid end 16, it is not necessary that seat deck 78 be sloped like seat deck 42.

Inner ring 58 and outer ring 68 are connected together by three, vertically oriented fins 82. Fins 82 radiate outwardly from exterior wall 62 of ring 58 at 120° intervals to join with inside wall 72 of ring 68. Fins 82 are, generally speaking, taller than they are wide to best withstand axial loads. Also, fins 82 slope upwardly from ring 58 to ring 68 so that stem 24 may be supported at a point as far below top surface 22 of seat 12 as practical to reduce the likelihood of piston wobble. Rings 58 and 68 and fins 82 being thin have been found to present such minimal impediments to fluid flow through guide 26 that fluid ends equipped with valve 10 are capable of handling fluids with higher proppant concentrations than normal.

Valve keeper 28 is fitted over the bottom of stem 24 and has a conical configuration. Thus, keeper 28 has an exterior diameter that increases gradually from its top, where it has the same diameter of exterior wall 62, to its bottom. Extending outwardly from the bottom of keeper 28 is a peripheral rim 84 that serves as an abutment for the bottom of spring 32.

A recess 86 is provided in the bottom of keeper 28 for receiving keeper pin 30 extended through a transverse aperture 88 in stem 24. It should be noted that the ends of recess 86 are closed to prevent pin 30 from slipping from aperture 88. To further ensure that pin 30 does not become unintentionally disengaged from aperture 88, pin 30 is provided with a peripheral groove 90 at its midpoint and stem 24 is provided with a transverse bore 92 that intersects the bottom of aperture 88 at its midpoint and right angles. A roll pin 94 can be driven into bore 92 so as to pass through groove 90 and lock pin 30 in place in the manner of a key.

From the foregoing, it should be appreciated that use of valve 10 is straightforward. After installation of valve 10 in fluid end 16, a plunger (not shown) is reciprocated above head 20. As the plunger moves forward to drive fluid from its cylinder, peripheral edge 48 of head 20 is snugly pressed under the influence of spring 32 against top surface 22 of seat 12 ensuring that no fluid leaks through passage 14. When the plunger travels back to its starting point, a partial vacuum is created that lifts piston 18 against the compressive force of spring 32 and draws fluid upwardly through passage 14 and valve. The process of opening and closing valve 10 is entirely automatic and requires mere fractions of a second to accomplish. Since the valve 10 minimizes turbulent flow, there is little likelihood that proppant will be captured by valve 10 to block flow through passage 14 under normal conditions of use. In fact, the resistance of valve 10 to knocking out proppant is so substantial that fluids containing greater proppant loads than those normally pumped can be delivered through valve 10 to provide substantial time and cost savings to some users.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A piston for a suction valve, composing:
    a head for engaging a top surface of a suction valve seat and a stem extending downwardly from said head through said suction valve seat, said stem having a first transverse aperture and a second transverse aperture; said second aperture opens to said first aperture, both said first and second aperture are at a lower portion of said stem, said first aperature at a right angle to said second aperture.

* * * * *

UNITED STATES PATENT AND TRADEMARK OFFICE
CERTIFICATE OF CORRECTION

PATENT NO. : 7,172,175 B2 Page 1 of 1
APPLICATION NO. : 10/764902
DATED : February 6, 2007
INVENTOR(S) : Berton L. Vicars It is certified that error appears in the above-identified patent and that said Letters Patent is hereby corrected as shown below:

On Title page add:   Related US Application Data
   Item (63) Continuation of Application No. 10/114,356
      filed 04/03/2002 now US Pat. No. 6,695,007

Column 1 line 2 insert: --This application is a continuation of my U.S. Application
   No. 10/114,356 filed on April 3, 2002 Now US Patent
   No. 6,695,007 issued on Feb. 24, 2004.--

Signed and Sealed this

Eighth Day of September, 2009

David J. Kappos
*Director of the United States Patent and Trademark Office*